United States Patent Office 3,554,985
Patented Jan. 12, 1971

3,554,985
CROSS-LINKED COPOLYMER POLYELECTROLYTES BASED ON ALPHA, BETA-ETHYLENICALLY UNSATURATED ACIDS
Joseph E. Fields, Ballwin, and John H. Johnson, Kirkwood, Mo., assignors to Monsanto Company, St. Louis, Mo., a corporation of Delaware
No Drawing. This application is a continuation-in-part of Ser. No. 777,499, filed Nov. 20, 1968, which is a continuation-in-part of Ser. No. 590,127, filed Aug. 19, 1966, now abandoned, which is in turn a division of Ser. No. 440,911, filed Mar. 18, 1965, now U.S. Patent No. 3,398,092, which is a continuation-in-part of Ser. No. 248,881, filed Jan. 2, 1963, now abandoned. This application Dec. 15, 1969, Ser. No. 885,266
Int. Cl. C08f 27/08
U.S. Cl. 260—78.5     16 Claims

ABSTRACT OF THE DISCLOSURE

Water-insoluble, cross-linked polyelectrolyte copolymers of (a) an unsaturated monomer of 2 to 12 carbon atoms and (b) a monomer selected from the group consisting of (1) a mixture of an unsaturated polycarboxylic acid or anhydride and an unsaturated polycarboxylic acid amine-imide, and (2) an unsaturated polycarboxylic acid amine-imide, the polymeric units of the polyelectrolyte containing at least three percent of an amine-imide group, which group is a diloweralkylaminoloweralkylimide group wherein lower alkyl has 1 to 5 carbon atoms inclusive, including acid addition and quaternary ammonium salts thereof, the polyelectrolyte having a molecular weight of at least 1000. The polyelectrolytes are used for purifying water contaminated with viruses, coliform bacteria, other microorganisms or surface active agents by adsorption.

CROSS-REFERENCE TO RELATED APPLICATIONS

This application is a continuation-in-part of co-pending application Ser. No. 777,499, filed Nov. 20, 1968, which application is a continuation-in-part of application Ser. No. 590,127, filed Aug. 19, 1966, now abandoned, which application is in turn a divisional application of application Ser. No. 440,911, filed Mar. 18, 1965, now U.S. Pat. No. 3,398,092, which is a continuation-in-part of application Ser. No. 248,881, filed Jan. 2, 1963, now abandoned.

The present invention relates to water purification agents and to methods for treating water to remove substances having harmful or objectionable characteristics.

More particularly this invention comprises the method for removing or inactivating virus present in water, to render the water more suitable for industrial or domestic use, by contacting the water with a hydrophilic water-insoluble polyelectrolyte prepared by the copolymerization of a polycarboxylic acid derivative with at least one other monomer.

It is an object of this invention to provide a novel and improved process for the purification of water containing viral contaminants.

It is another object of this invention to provide a novel and improved process for the purification of water containing synthetic surface active agents.

It is yet another object of this invention to provide a novel and improved process for the removal of contaminants including bacteria, viruses, and surfactants by adsorption.

It is a further object to provide novel and improved adsorbents for the purification of water.

The removal of contaminants from water represents an important problem in the purification and clarification of both potable and industrial waters. It has been well established that these contaminating materials enter the water via passage through sewage treatment plants, through seepage from septic tank systems, and through many miscellaneous sources. An efficient sewage treatment plant, during periods of optimum operation, may inactivate better than 90% of the bacteria and viruses entering the plant if an activated sludge process is employed in conjunction with a primary sedimentation process. On the other hand, during periods of sudden and heavy rainfall, or other periods of temporary overloading of the treatment plant, comparatively high percentages of contaminants are discharged to streams or rivers. The contaminants dumped into a body of water by a governmental unit, or by individuals, must be removed before the water is distributed to successive users.

Another common source of contamination can be traced to septic tank and cesspool disposal of sewage. Effluent water seeping from these units contaminates underground water sources such as wells. It is known that certain surfactant molecules are biologically degraded by microorganisms under aerobic conditions such as are present in a flowing stream; however, these surfactants resist degradation in an anaerobic system such as is present in a septic tank system. Further cases have been documented where infectious hepatitis, a viral disease, was most probably caused by ingestion of viral contaminated water which found a path from a sewage system to a drinking-water well.

In populated regions where production or use of synthetic chmeical compounds is extensive, appreciable quantities of biologically resistant materials find their way into water supplies and lead to persistent reduction in the quality of the water. As urbanization and industrialization expand and as the demands of a growing population make necessary an increasing re-use of available water supplies, such pollutants become of major and widespread hygienic concern. The major problem with these chemical pollutants arises from their failure to exhibit susceptibility to biochemical oxidation rather than from the oxygen-depleting effect of their biological oxygen demand (B.O.D.). Since these materials are not oxidized biologically, they persist in water for long periods of time and become multiplied to high concentrations with multiple re-use of the water. Although domestic wastes of metabolic origin are generally susceptible to biochemical oxidation, materials from these sources are frequently found in high concentrations at the inlet of a municipal water supply.

The synthetic surface-active agents which represent many different chemical structures, are typical examples of the materials which are resistant to biochemical oxidation. The polyelectrolytes of the invention are especially suitable for removing ionic surface active agents. The alkylbenzenesulfonates are recognized as contaminants in water supplies, but numerous other types of compounds, including substituted phenolic and other aromatic compounds, polyethylene glycols, secondary and tertiary amines, hydrocarbons, ketones, and chlorinated insecticides, are also of concern. Foaming and problems of taste and odor have been the difficulties most frequently attributed to these materials, but impairment of coagulation, fouling of ion-exchange resins and potential toxicity or carcinogenicity are other factors of concern. It is an object of the instant invention to provide an effective method for the removal of these substances from waste and water supplies.

Activated carbon is commonly employed for the adsorption of certain contaminants from water. However, its use is generally limited to the removal of certain odor- or taste-producing contaminants and in certain cases for the adsorption of surface-active materials. Activated carbon has a limited use, however, as a general purpose adsorbent for water purification, and it is relatively expensive to use for this purpose. Additionally activated carbon when employed as a granular material, is fragile and thus difficult to regenerate and re-use. By the practice of our invention, water-insoluble, cross-linked polyelectrolyte copolymers can be used to remove a wide variety of contaminants and furthermore these materials are operative under conditions where activated carbon is totally unsuitable.

According to commonly accepted procedures, killing and removal of organic growths is usually accomplished in the settling basin of the water treatment plant. This is done with chlorine and coagulation, settling and filtration. Chlorination is frequently of value in reducing the dosages of coagulant required. In many cases the bulk of the organic matter is removed by coagulation, settling, and filtration, followed by post-chlorination. However, it has been determined that alum or ferric chloride does not provide quantitative removal of bacteria or viruses. Furthermore, gummy substances and synthetic detergents interfere with the flocculation process.

The viricidal efficiency of free chlorine is dependent on pH, temperature, chlorine concentration and exposure time. Inactivation of some enteric viruses cannot be attained by exposure to 0.2 mg. of chlorine per liter of water for 10 minutes at pH of 7.0 (the usual bacterial parameters of disinfection) at an initial level of 300 to 3000 virus doses per ml. of water. During those intervals when the water to be treated contains an unusually high concentration of a substance such as a detergent or unexpectedly high concentrations of virus or bacteria, the conventional water purification practice will not remove quantitatively the contaminating surface-active agents, microorganisms and viruses.

In a prior patent (United States Pat. No. 3,157,595, issued Nov. 17, 1964) in which we are named as inventors, we have disclosed certain polyelectrolytes which could contain a limited amount of imide linkages and which could tolerate a certain very limited degree of cross-linking always short of that amount which would render the polyelectrolyte water-insoluble since our object in the previous patent was to provide flocculants for water clarification purposes. For flocculation and water clarification procedures it is essential that the polyelectrolyte be water soluble and in our earlier patent our polyelectrolytes were so disclosed as being necessarily water soluble and they were disclosed by us as being employed in water solution form. It was specifically taught by us in the named patent that the compounds provided by that invention were necessarily water soluble and to be used in the form of a dilute water solution. We specifically taught that no substantial cross-linking or imide content could be tolerated and moreover we specifically taught how to avoid same, in that cross-linking was undesirable and only a limited amount of imide content could be tolerated in order not to unduly reduce or entirely eliminate the desired use of those compounds as flocculants for which purpose, to repeat, it was essential that they be water soluble and have only a limited imide content.

In direct contrast to that invention and our disclosure relating thereto we have now found that certain polyelectrolytes which are cross-linked to the point of water-insolubility and which have a certain minimum degree of a particular type of amine-imide content are unpredictably and surprisingly effective in the adsorption of virus from fluids, especially water, containing the same, and the cross-linked water-insoluble polyelectrolyte having the certain minimum amine-imide content which are surprisingly useful in the aforesaid manner constitute the subject matter of the present invention. Data evidencing the surprising activity over a broad range is included hereinafter.

We have also found, according to presently known and practiced procedures, that it is not possible to attain the minimum amine-imide in the polyelectrolyte of the present invention without substantial cross-linking and without rendering them insoluble whether or not additional cross-linking agents of the unsaturated, primary amine, or other types are employed for the specific purpose of insolubilization.

Water-insoluble is defined for the purposes of this specification and claims to mean that the polyelectrolyte must not swell in water to such an extent that it forms a stable dispersion or gel in water, since the polyelectrolyte must not contaminate the water and must be readily separable from water as when water is percolated through a bed of polyelectrolyte particles, water is passed through a filter coated with the polyelectrolyte, polyelectrolyte particles are separated from water by decantation or filtration, or the like.

Suitable water-insoluble polyelectrolytes for practicing the instant invention contain ionizable hydrophilic groups. Water soluble polymers can be utilized by introducing sufficient cross links during the preparation of the polymer or by subsequent treatment of the polymer to make the polymer water-insoluble. The cross-linked polymers can be and are obtained as three-dimensional networks which do not dissolve in water, i.e., are water-insoluble, and which can be used to adsorb contaminants from water.

By "polyelectrolyte" it is intended to include only polymeric organic substances which, when contacted with an aqueous medium or aqueous alkaline or aqueous acidic medium, will form organic ions having a substantial number of electrical charges distributed at a plurality of positions thereon.

The polyelectrolytes of the present invention are water-insoluble, cross-linked copolymers of an (a) unsaturated monomer of 2 to 12 carbon atoms and (b) a monomer selected from the group consisting of (1) a mixture of an unsaturated polycarboxylic acid or anhydride and an unsaturated polycarboxylic acid amine-imide, and (2) an unsaturated polycarboxylic acid amine-imide, the polymeric units containing a defined minimum percentage of an amine-imide group which group is a diloweralkylaminoloweralkylimide group wherein loweralkyl has 1 to 5 carbon atoms. When a polymer of the type here concerned is prepared, as further illustrated hereinafter, each combination of a single unit of the unsaturated monomer and the polycarboxylic acid or anhydride or derivative thereof produces a copolymeric unit in which one molecule of each of the two different types of monomer employed are combined. Such a combination of one molecule of each of the units is referred to as a polymeric unit. Each such polymeric unit will contain reactive sites in the form of an anhydride group or two carboxyl groups or derivative of these groups. When these groups can be further reacted, they are referred to as reactive sites. In the polyelectrolyte of the invention at least three percent of the reactive sites are converted to the requisite diloweralkylaminoloweralkylimide, either by reaction of monomer with the necessary amine prior to polymerization or by post reaction of the requisite amine with the pre-formed polymer containing reactive groups. Thus, in the compounds of the invention it can be said that at least four percent of the reactive groups are converted to diloweralkylaminoloweralkylimide groups. Alternatively, since each polymeric unit can be considered to contain one reactive site, it can be stated that in the compounds of the present invention at least four percent of the polymeric units contain the requisite amine-imide group.

Due to the reactivity of the monomers, the polymeric reaction product of many of the unsaturated starting materials with many of the unsaturated anhydrides or derivatives thereof is mainly productive of copolymeric material in which the ratio of the monomers is approximately 1:1 or close thereto. One example is the copolymerization of ethylene and maleic anhydride which produces mainly approximately 1:1 copolymer even when large excess of one of the monomers is employed in the reaction. In other cases, for example, the copolymerization of styrene and itaconic anhydride, it is readily possible to vary the ratio of the starting monomers in the copolymer product merely by varying the relative quantities of starting monomer. In any event, this invention is not limited to copolymers having a 1:1 ratio or thereabout of starting monomers, as these ratios may be varied considerably, although in some cases requiring special conditions of reaction, such as large excesses of one or the other of the starting monomers, higher or lower reaction temperatures and the like, all as readily apparent to one skilled in the art. The products of the invention for operativeness only require (1) water-insolubility and (2) the presence of three percent of an amine-imide group which group is a diloweralkylaminoloweralkylimide group.

Because of its ready availability and ease of preparation, the preferred type of polymeric material useful in the practice of the invention is the equimolar copolymer of an olefinically unsaturated polycarboxylic acid, or anhydride and at least one other monomer copolymerizable therewith, which is cross-linked sufficiently to make the copolymer water-insoluble and which contains at least three percent of the requisite amine-imide group. The polycarboxylic acid or anhydride can be maleic anhydride, maleic acid, fumaric acid, itaconic acid, citraconic acid, aconitic acid, the amides of these acids (including partial amides and their salts), the alkali metal, alkaline earth metal, and ammonium salts of these acids, the partial alkyl esters, salts of the partial alkyl esters and the substituted amides of these polycarboxylic acids and their salts. The carboxylic acid, carboxylic acid salt, amide and substituted amide radicals can be among the groups which contribute to the hydrophilic properties. Hydrophilic properties may also be due to the comonomer, as when acrylic acid, acrylamide, acrylic acid salts of alkali metals and ammonium, N-substituted acrylamide and the corresponding derivatives of methacrylic, crotonic or other polymerizable acids are used. When the hydrophilic maleic acid derivatives are used, hydrophobic comonomers can be used, for example, ethylene, propylene, isobutylene, octene-1, styrene α-methylstyrene, vinyl acetate, vinyl chloride, vinyl formate, vinyl alkyl ethers, alkyl acrylates and alkyl methacrylates.

In the practice of this invention, polycarboxylic acid derivatives of the copolymers can be sodium maleate, potassium maleate, ammonium maleate, calcium maleate, monosodium maleate, monopotassium maleate, monoammonium maleate, monocalcium maleate, a monoalkyl maleate, maleic acid amide, the partial amide of maleic acid, the N-alkyl substituted maleic acid amide, the N-aminoethyl maleamide, the N-aminoethyl maleimide, the alkylaminoalkyl maleamides, and the corresponding derivatives of itaconic, citraconic, fumaric and aconitic acids. Any of the said polycarboxylic acid derivatives may be copolymerized with any of the other monomers described above, and any other which forms a copolymer with polycarboxylic acid derivatives in equimolar or other proportions. The polycarboxylic acid derivatives can be copolymers with a plurality of comonomers, in which case the total molar proportions of the comonomers can typically be equimolar with respect to the polycarboxylic acid derivatives. Although such copolymer derivatives can be prepared by direct polymerization of the various monomers, frequently they are more easily prepared by an after reaction of other copolymers as hereinbefore stated. For example, copolymers of maleic anhydride and another monomer can be converted to maleic acid copolymers by reaction with water and to salts of the copolymers by reaction with alkali metal compounds, alkaline earth metal compounds, amines, ammonia, etc.

Certain of the derivatives of unsaturated polycarboxylic acids are readily polymerizable in less or greater than equimolar proportions with certain of the less hydrophobic comonomers such as acrylic acid, the alkali metal and ammonium salts of acrylic acid, acrylamides, and the various N-substituted acrylamides, methacrylic acid, the alkali metal and ammonium salts of methacrylic acid, methacrylamide and the various N-substituted methacrylamides, crotonic acids and the alkali metal and ammonium salts of crotonic acids, the crotonamides and the N-substituted crotonamides, and vinyl phosphonic acid. The derivatives of polycarboxylic acids include the half alkyl esters of maleic acid, and the partial alkyl esters of fumaric, itaconic, citraconic and aconitic acids. When less than 50 mole percent of such polybasic acid derivatives are used, the minimum proportion of polybasic acid derivative is that which will render the copolymer hydrophilic in its overall effect, thus we prefer to employ in such cases at least 20 mole percent of the monomer of the polybasic acid derivative.

Another modification of the copolymers of the various unsaturated polycarboxylic acid derivatives are those wherein more than 50 percent of the polycarboxylic acid derivative is readily copolymerized therein. This type, of which fumaric acid and itaconic acid are examples of the hydrophilic monomer, can involve a wide variation with respect to the non-hydrophilic monomer, ethylene, propylene, isobutylene, octene-1, styrene, α-methylstyrene, vinyl acetate, vinyl formate, vinyl alkyl ethers, alkyl acrylates and alkyl methacrylates being useful. If desired, the comonomer can be one which contributes to the hydrophilic property, for example, vinyl alcohols, acrylic acid, methacrylic acid, acrylamide, methacrylamide and the various amides which have alkyl, aminoalkyl, or alkylaminoalkyl substituents on the nitrogen atom. The proportions of these various comonomers typically contemplate the use of more than 50 mole percent of the polybasic acid derivative and less than 50 mole percent of the comonomer. The comonomer can be used in relatively small proportions, depending upon the hydrophilic or hydrophobic nature of the comonomer; for certain applications of these polymers in the practice of our invention, such as columnar operation, sufficient total hydrophilic groups in both monomers must be present to render the resultant copolymer water wettable under the conditions of use. This type of copolymer may involve a plurality of the polycarboxylic acid derivatives and/or a plurality of the comonomers.

Other useful polymeric polyelectrolytes are the homopolymers of polymerizable polycarboxylic acids and the water-insoluble derivatives thereof, e.g. homopolymeric monoethyl fumarate, homopolymeric fumaramide, the half ammonium salt, half methyl ester of homopolymeric fumaric acid, etc.

Other useful polymeric polyelectrolytes are the polymers which derive a portion of their hydrophilic characteristics from the presence of amine radicals. These include the polyvinylpyridines, the poly-N-vinyl amines, the poly-N-allylamines, the heterocyclic nitrogen compounds wherein the nitrogen is a tertiary amino group, and the amine and ammonium salts of said cyclic compounds. The vinylamines can be present in copolymers with vinyl acetate, vinyl formate, vinyl chloride, acrylonitrile, styrene esters of acrylic acid, esters of methacrylic acid, and other monomers capable of existing in copolymeric form with the N-vinyl amines. Included within the scope of this type of polymeric polyelectrolyte are the polymers of products derived by the hydrolysis of amides and imides, such as N-vinyl formamide, N-vinylacetamide, N-vinylbenzamide, N-vinyl-N-methylformamide, N-vinyl-N-methylacetamide, N-vinyl-N-methylbenzamide, N-vinylphthalimide, N-vinylsuccinimide, N-vinyldiformamide, and N-vinyldiacetamide. Similarly, copolymers of these various amides with other polymerizable monomers can be first prepared and subsequently hydrolyzed to the corresponding vinyl amine derivatives. The polyallylamines and polymethallylamines and copolymers thereof can be prepared by copolymerizing acrylonitrile or methacrylonitrile, alone or in the presence of other monomers, and then by hydrogenation converted into amine-containing polymers.

Another important class of polymeric polyelectrolytes includes the polymers of vinyl substituted amides, such as N-vinyl-N-methylformamide, N-vinyl-formamide, N-vinylacetamide, and other vinyl substituted amides such as N-vinyl pyrrolidone, the polymers of which have hydrophilic characteristics. Useful compounds include homopolymers and copolymers with vinyl acetate, acrylonitrile, isobutylene, ethylene, styrene, vinyl chloride, vinylidene chloride, vinyl formate, vinyl alkyl ethers, alkyl acrylates, alkyl methacrylates, and copolymers with the more hydrophilic monomers, such as acrylic acid, methacrylic acid, acrylamide, methacrylamide, the various substituted amides, monoalkyl esters of maleic acid, the aminoalkyl metal and ammonium salts of acrylic or other polymerizesters of acrylic or other polymerizable acids, the alkali able acids, and other polymerizable compounds with ionizable functions.

As described above in connection with the various types of polyelectrolytic polymers suitable for the practice of this invention, the hydrophilic polymer can be prepared directly by the polymerization or copolymerization of one or more of the various available organic monomers with aliphatic unsaturation, if the said compounds contain a hydrophilic group, especially for example, carboxyl groups. Generally, more types of polyelectrolytic polymers can be prepared by subsequent reactions of polymers and copolymers. For example, polymers containing nitrile groups can be hydrolyzed to form amide and carboxy containing polymers or hydrogenated to form amine containing polymers. Similarly copolymers of maleic anhydride and vinyl acetate can be hydrolyzed to form polymers containing hydrophilic lactone rings. Other hydrophilic polymers can be prepared by the hydrolysis of copolymers of vinyl acetate wherein the acetyl groups are removed leaving hydroxy groups which promote the hydrophilic effect of polyelectrolytic groups present. By other reactions nonhydrophilic polymers can be converted into lactam or amide containing polymers which are more hydrophilic. Polyvinyl alcohol, not in itself a polyelectrolyte, can be converted into polyelectrolytes by esterification with dibasic acids, one of said carboxylic acid groups reacting with the alcohol radical and the other providing the hydrophilic characteristics by a carboxy group on the side chain. Still other types of polymers can be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be a hydrophobic polymer. Other hydrophilic polymers can be prepared by the ammonolysis of ketone-containing polymers, for example, polyvinyl methyl ketone. Other types of polymers prepared by the subsequent reaction of previously prepared polymers have been explained above in connection with the vinyl amine polymers by hydrolysis of the N-vinyl amides.

Copolymers are conveniently identified in terms of their monomeric constituents. The names so applied refer to the molecular structure and are not limited to the polymers prepared by the copolymerization of the specified monomers. In many instances the identical copolymers may be prepared from other monomers and converted by subsequent chemical reaction to the desired copolymer.

Thus, the various polyelectrolytes of the types described above are ethylenic polymers having numerous side chains distributed along a substantially linear continuous carbon-carbon backbone. The side chains can be hydrocarbon groups, carboxylic acid groups or derivatives thereof, phosphonic acid or derivatives thereof, heterocyclic nitrogen groups, aminoalkyl groups, alkoxy radicals and other organic groups the number of which groups and the relative proportions of hydrophilic and hydrophobic groups being such as to povride a polymeric compound having a substantially large number of ionizable radicals. Said continuous carbon chain must represent a degree of polymerization of at least eight.

For optimum beneficial effect the molecular weight of the basic polymer structure (not taking in account the cross-linking which can lead to infinite molecular weight) is of some importance. It appears that molecular weights in excess of 1000 (DP of 8) are desirable to obtain satisfactory adsorption of the water-contaminating materials and microorganisms. The optimum molecular weight for a particular polymer depends to a certain extent on the method of water treatment as described below. With some copolymers within the scope of this invention the adsorption effect reaches a maximum at low molecular weights. With others, a maximum may not be reached before molecular weights of 80,000 to one and one-half million, and further increases in molecular weights may not improve the polymer.

Particularly valuable copolymers are those derived from hydrocarbon olefin and maleic acid and the ammonia or amine derivatives thereof. Such copolymers have the formula

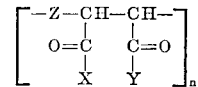

wherein Z is a bivalent hydrocarbon radical of from 2 to 12 carbon atoms, wherein Z is free of aliphatic unsaturation, X and Y are radicals selected from the class consisting of —OH, —ONH$_4$, —ONRH$_3$, —ONR$_2$H$_2$, —ONR$_3$H, —ONR$_4$, —NH$_2$, —NHR, and —NR$_2$, R being an alkyl radical of from 1 to 18 carbon atoms, or an alkyl radical containing a tertiary or quaternary nitrogen atom and wherein X and Y together may be >NH or >NR, and $n$ is an integer indicative of the degree of polymerization. Preferably, $n$ is an integer having a magnitude of at least 8, and can be as great as 10,000, or more.

One class of presently useful copolymers includes the ammonium and alkylamine salts of maleic acid/C$_2$–C$_{12}$ mono-olefin copolymers, wherein the alkylamine can have from 1 to 18 carbon atoms in the alkyl radical, or can be an aminoalkylamine. Such salts have the formula:

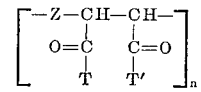

where T is selected from the class consisting of —ONH$_4$, —ONR$_4$, —ONRH$_3$, —ONH$_2$R$_2$, ONHR$_3$, —NH$_2$,

—NHR and —NR$_2$, where R is an alkyl radical of from 1 to 18 carbon atoms, or an alkyl radical containing a tertiary or quaternary nitrogen atom, T' is selected from the class consisting of T and —OH, and where $n$ and Z are as described above. Copolymers having the above formula include the mono-ammonium or diammonium salts of maleic acid-ethylene copolymer, of maleic acid-propylene copolymer or of maleic acid-1- or 2-butene, isobutylene, or 1-hexene copolymer; the mono- or di-alkylamine salts of such copolymers, e.g., the methyl-, ethyl-, isopropyl-, dodecyl-, hexadecyl- or octadecylamine salts of maleic acid-1-hexene or 1-octene copolymer, the dimethyl-, methylethyl, diethyl-di-n-propyl-, di-n-hexyl- or bis(2-ethylhexyl)amine salt of maleic acid-ethylene, 1-butene, 1-hexene, 1-decene, or 1-dodecene copolymer; and mixed ammonium alkylamine salts such as the ammonium n-propylamine salt or the ammonium dimethylamine salt of maleic acid-ethylene or propylene copolymer.

In the above formula Z, a bivalent hydrocarbon radical, can be an aralkylene radical derived from aromatic-substituted olefins, e.g., styrene, α-methylstyrene, the isomeric vinyltoluene, vinyl naphthalene. The hydrocarbon chain extending along the polymer backbone can also have other alicyclic substituents attached thereto. Thus Z can be the hydrocarbon radical obtained by the copolymerization of say maleic anhydride with ethylidene cyclohexane, allyl cyclopentane, allyl cyclohexane, or isopropenyl cyclobutane.

Another class of presently-useful copolymers includes the mono- and diamides of maleic acid-ethylene, propylene, isobutylene, 1- or 2-butene, 1-hexene, 1-octene, or 1-decene copolymers as well as the corresponding N-alkyl or N,N-dialkyl amides and their quaternary salts. This class may be represented by the formula:

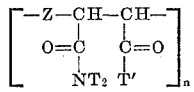

in which Z is a bivalent hydrocarbon radical of from 2 to 12 carbon atoms. This hydrogen, an alkyl radical of from 1 to 18 carbon atoms, or an alkyl radical containing a tertiary or quaternary nitrogen atom, T' is selected from the class consisting of —NT$_2$ and —OH, and $n$ is an integer indicating the degree of polymerization. As illustrative of copolymers having the above formula may be mentioned the monoamide of maleic acid-ethylene or propylene copolymer, the N-butyl amide of maleic acid-ethylene, isobutylene, or 1-hexene copolymer, the diamide of maleic acid-ethylene, 2-butene, 1-octene or 1-decene copolymer, the N,N'-dimethyl-, N,N'-diethyl, N,N'-di-n-propyl, or N,N-methylethyl diamide of maleic acid-propylene, butene, hexene or octene copolymer and the N,N,N',N'-tetramethyl-, N,N,N'N'-tetraethyl-, N,N,N'N' - tetra - n-propyl or N,N-dimethyl, N',N'-didodecyl diamide of maleic acid-ethylene, propylene or 1-butene copolymer. When Z is an aralkylene radical, representative copolymers include the half amide of maleic acid-styrene copolymer, the diamide and alkyl-substituted diamides of maleic acid-styrene or α-methylstyrene copolymer.

Still another class of the presently-useful derivatives of maleic acid/C$_2$–C$_{12}$ mono-olefin copolymers includes the half-ammonium salts, half-amides of the formula:

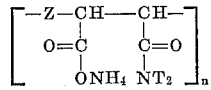

in which T is selected from the class consisting of hydrogen, alkyl radicals of from 1 to 18 carbon atoms, and alkyl radicals containing a tertiary or quaternary nitrogen atom, and Z and $n$ are as herein defined. Representative members of this useful class include the ammonium salt of maleic acid-ethylene or propylene copolymer monoamide, the ammonium salt of maleic acid-ethylene or propylene copolymer N-methyl-, N-ethyl, N-n-propyl or N-dodecyl or N-octadecyl mono-amide, the ammonium salt of maleic acid-ethylene or propylene copolymer N,N-dimethyl-, N,N-diethyl-, N,N-ethyl-, methyl or N,N-di-n-propyl-monoamide, and the ammonium salt of maleic acid-styrene copolymer N,N-dimethyl, or N,N-diethylamide.

Also presently useful are the imides of maleic acid/C$_2$–C$_{12}$ mono-olefin copolymers of the formula:

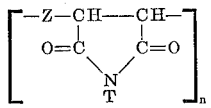

in which T is selected from the class consisting of hydrogen, alkyl radicals of from 1 to 18 carbon atoms, and alkyl radicals containing a tertiary or quaternary nitrogen atom, and Z and $n$ are as herein defined. Examples of imides having the above formula include the imide of maleic acid-ethylene copolymer, the imide of maleic acid-propylene copolymer, the imide of maleic acid-styrene copolymer, the imide of maleic acid-2 butene copolymer or the N-methyl, N-ethyl, N-propyl, N-isopropyl, N-octyl, N-hexadecyl or N-octadecyl derivatives of such imides. Partially imidized copolymers can likewise be used.

A particularly preferred class of derivatives of maleic acid/C$_2$–C$_{12}$ mono-olefin copolymers includes the amino-amides, the aminoimides and salts that can be derived from them. These classes of polyelectrolytes can further be converted to useful polymers containing a quaternary nitrogen atom. The aminoamides can be represented by the formula

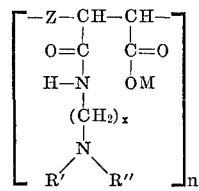

wherein Z and $n$ are as defined above, $x$ is an integer from 1 to 5, R' and R'' are each alkyl radicals of from 1 to 5 carbon atoms, and M is hydrogen, ammonium radical, or a metallic ion of an alkali or alkaline earth metal.

The polymeric materials containing the aminoamide linkage as illustrated above can be converted to the corresponding aminoimide by heating at 100° to about 170° C., preferably at 130° to 150° C. to give the polymer corresponding to the formula

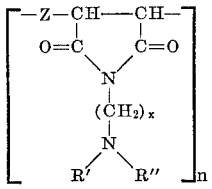

wherein Z, $n$, $x$, R' and R'' are as described above.

The aminoamides and aminoimides derived from the maleic acid/C$_2$–C$_{12}$ mono-olefin copolymers are useful in purifying water according to our invention; however, in certain instances their efficacy as hydrophilic polyelectrolytes can be further improved by conversion of at least a portion of the tertiary nitrogen atoms to quaternary nitrogen atoms. In certain instances the copolymer containing the tertiary amine linkages can also be employed as the amine hydrohalide salt by treatment with a hydrogen halide, e.g., HCl. The quaternary ammonium derivatives are readily prepared by reaction with an alkyl halide of the formula R'''X, wherein R''' is an alkyl radical of 1 to 18 carbon atoms and X is a halogen atom. Aralkyl halides, such as benzyl halide, can also be used to prepare the quaternary ammonium salts. These useful derivatives can be represented by the formulas

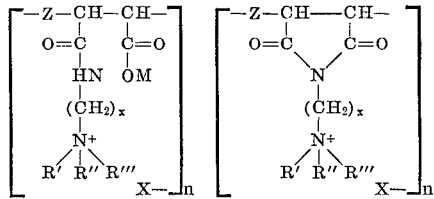

wherein Z, M, $n$, $x$, R' and R'' are as described above, R''' is an alkyl radical of 1 to 18 carbon atoms or an aralkyl radical of 7 to 12 carbon atoms and X is a halogen atom. As illustrative of copolymers having the above formulas may be mentioned the diethylaminoethyl amide of maleic acid-ethylene, 1-butene, or styrene copolymer, the dimethylaminopropyl amide of maleic acid-ethylene, 1-hexene, 1-octene, or styrene copolymer, ammonium salt, the dipropoylaminoethyl imide of maleic acid ethylene, propylene, or styrene copolymer, the dimethylaminopropyl amide of maleic acid-ethylene, octene, or styrene copolymer, as the methyl iodide quaternary salt, or the octadecyl bromide quaternary salt of diethylaminobutyl imide of maleic acid-ethylene, propylene or styrene copolymer.

The above presently-useful free acids, salts, amides, and half salts-half amides, imides and quaternary ammonium amides and imides of maleic acid C$_2$–C$_{12}$ hydrocarbon monoolefin compolymers are known materials which are obtainable in commerce or by methods well known to those skilled in the art. For convenience, however, a resume of such methods is given herewith.

In practice, the present hydrophilic derivatives of maleic acid hydrocarbon olefin copolymers are prepared from readily available maleic anhydride hydrocarbon olefin copolymers, for example, as described in the Hanford U.S. Pats. 2,378,629 and 2,396,785. Generally, the copolymers are prepared by reacting ethylene, proypylene, isobutylene, 1- or 2-butene, 1-hexene, 1-octene, 1-decene, 1-dodecent, styrene, α-methylstyrene, vinyl toluene, or mixtures of these olefins with maleic anhydride in the presence of a peroxide catalyst in an aliphatic or aromatic hydrocarbon which is a solvent for the monomers but is a non-solvent for the interpolymer formed. Suitable solvents include benzene, toluene, xylene, chlorinated benzene, hexane acetone and the like. While benzoyl peroxide is the preferred catalyst, other peroxides such as acetyl peroxide, butyryl peroxide, di-tertiary butyl peroxide, lauroyl peroxide and the like or any of the numerous azo catalysts are all satisfactory since they are soluble in organic solvents. The copolymer typically contains substantially equimolar quantities of the olefin residue and the maleic anhydride residue. The properties of the polymer, such as molecular weight, for example, may be regulated by proper choice of the catalyst and control of one or more of the variables such as ratio of reactants, temperature, and catalyst concentration or the addition of regulating chain transfer agents. The product is obtained in solid form and is easily recovered by filtration, centrifugation or the like. Removal of any residual or adherent solvent can be effected by evaporation using moderate heating.

The maleic anhydride copolymers thus obtained have the formula

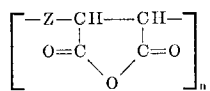

where Z corresponds to a bivalent hydrocarbon radical, free of alphatic unsaturation, and having the carbon content of the olefin monomer which was used and $n$ denotes the degree of polymerization.

Said anhydride copolymers are readily hydrolyzed by heating with water to yield the acid form of the copolymer:

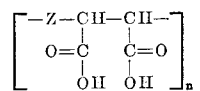

The mono- or diammonium or alkali metal salts can be readily obtained by reacting the copolymer in its anhydride or acid form with the stoichiometric amount of ammonium hydroxide or alkali metal hydroxide. The mono-, di- or tri-alkylamine salts are prepared by reacting the copolymer in its acid form with the appropriate amine, e.g., methylamine, triethylamine or diisopropylamine; whether a mono-salt or a di-salt is formed depends upon whether the quantity of alkylamine used is sufficient to react with both caboxy groups or sufficient only for the neutralization of one carboxy group. Mixed salts, e.g., half-ammonium, half-alkali metal salts are prepared by first reacting with a quantity of alkali metal hydroxide calculated to give the partial alkali metal salt and then reacting the residual free carboxyl radical with sufficient ammonium hydroxide to neutralize said radical.

Amides are prepared generally by reacting the finely-divided maleic anhydride/$C_2$–$C_{12}$ olefin copolymer with ammonia gas at ordinary or elevated temperatures. Half-salts, half-amides are first formed by this procedure. Heat is generally liberated in the preparation of the half-ammonium salt, half-amide, and it is thus desirable to provide some means for dissipating it so that the product will not be affected by excessively high temperatures. One effective means for controlling the heat of reaction consists of suspending the solid polymer in an inert organic liquid such as benzene and bubbling ammonia through the slurry.

The polyelectrolytes useful in the practice of this invention are water-insoluble although in many instances it is desired to have the material wetted by water. The materials can be adjusted to give the water-insolubility characteristics by regulation of the type and ratio of hydrophilic to hydrophobic groups, and by controlling the degree of cross linking. If water-soluble polymer is obtained it, of course, fails to have adsorbent properties when contacted with water since it dissolves. Thus additional contaminant would be introduced into the water.

Cross-linking of a controlled degree can be obtained by polymerizing a small amount of a difunctional monomer along with the other monomers, e.g., maleic anhydride and $C_2$–$C_{12}$ monoolefin. Suitable monomers for this purpose include divinylbenzene, and the vinyl or allyl esters of unsaturated acids, such as vinyl acrylate, vinyl crotonate, vinyl methacrylate, allyl acrylate, allyl crotonate, and allyl methacrylate. Divinyl benzene is especially suitable for cross-linking styrene/maleic anhydride copolymer, and the vinyl or allyl esters for cross-linking ethylene, propylene or isobutylene/maleic anhydride copolymers. It is generally preferred that from about 0.1 to 10 mole percent of cross-linking agent be used based on the total number of moles of reacting monomers.

As an alternate procedure for the preparation of the three-dimension polymer network, we can advantageously use a difunctional compound for cross-linking preformed maleic acid/$C_2$–$C_{12}$ monoolefin copolymer. By way of example this can be achieved by reaction between the copolymer and a polyamine, e.g., in the reaction of the copolymer with a dialkylaminoalkylamine, from 0.1 to 10 mole percent of the latter can be substituted by the equivalent molar quantity of ethylenediamine. Thus the quantity of cross-linked polymer in the overall polymer can be precisely controlled. It is understood that ethylenediamine is a typical example of a cross-linking reagent, but many other compounds such as the group of alkalene polyamines can be used for this purpose.

Cross-linking of a preformed polymer can also be accomplished by irradiating the polymer with high energy radiation till the desired degree of cross-linking is obtained. High energy alpha rays, electrons, X-rays, gamma rays, neutrons and the like can be used as the high energy radiation for this purpose. Cross-linking of polymers in this fashion is well known in the art.

Yet another way of cross-linking a preformed polymer is by bonding a water-soluble polyelectrolyte to a water-insoluble substrate. This bonding to the substrate can be achieved through covalent, hydrophobic or hydrogen bonding or combinations thereof, provided the bonding is sufficient to prevent the polymer from being washed by water from the substrate. The polymer is thereby insolubilized while leaving polymer surface available for purification of water by process of the invention.

Although we do not intend to limit the scope of our instant invention to any particular theoretical aspect, it appears that there is a logical explanation why our process operates successfully and efficiently. The electrical and chemical nature of infectious agents, such as the bacteria and viruses, results in electrostatic bonds between these agents and the hydrophilic polyelectrolytes. The ion exchange resins are not effective in removing viral contaminants even though these resins often possess hydrophilic groups. The ion exchange resins are ordinarily effective in their designed function because the ions penetrate into the resin sphere; however, the comparatively large size of the virus protein molecule prevents its penetration into the adsorbent particle. Therefore, only a very few viruses are adsorbed on the exterior sites of the ion exchange resin. On the other hand, the hydrophilic copolymers of a maleic acid/$C_2$–$C_{12}$ monoolefin derivative according to the invention possess enormous active surfaces which possess extremely high absorption capacity. Thus our hydrophilic copolymers, which are prepared in a solvent system which dissolves the comonomers, but which is a non-solvent for the product copolymer, are obtained in a physical form ideally suited to perform as adsorption agents.

The preferred hydrophilic polyelectrolytes prepared by the solvent-nonsolvent polymerization technique have a surface area of 40 to 50 square meters per gram of polymer. These high values provide a marked contrast to the surface areas of conventional ion-exchange resins which have a surface area of about 0.1 to 1 square meter per gram of resin. Acceptable adsorption efficiency is obtained when the hydrophilic polyelectrolyte has a surface area of at least 10 square meters per gram of polymer. These numerical values are obtained by measuring the quantity of nitrogen adsorbed upon a weighed, degassed sample. The measurement of effective surface area is commonly determined by the B.E.T. test method.

The physical differences between the hydrophilic copolymers useful in the practice of our invention and the conventional ion exchange resins have been confirmed by electron microscopy. The derivatives of maleic copolymers, pulverized to pass a 325 mesh screen, were compared with commercial ion exchange materials which had been similarly pulverized to pass through a 325 mesh screen. Apparently the solvent-nonsolvent polymerization technique used to prepare the maleic copolymers gives them a very small ultimate particle size of about 0.1 micron as measured across the particle image and a porous irregular structure with high surface area (the ultimate particle size is determined by electron microscopy as distinguished from the apparent particle size which is determined by physical processing steps, e.g., sieve size). On the other hand the ion exchange materials have non-porous, smooth surfaces and have ultimate particle sizes in the range of 6 to 25 microns or more. We prefer to employ in the practice of the instant invention the hydrophilic polyelectrolytes derived from a copolymer of an unsaturated polycarboxylic acid derivative wherein the ultimate particle size is less than about one micron as determined by electron microscopy.

With constantly increasing rates of population growth, and with concurring water shortages, a higher demand is being made on water supplies. There is fairly good current agreement as to limiting concentrations of coliform organisms in water sources that can be rendered bacteriologically safe by conventional water treatment processes. A most probable number (MPN) of 20,000, per 100 ml. of water, for coliform organisms appears to be accepted as the maximum safe limit for prechlorination, presedimentation, rapid sand filtration and continuous postchlorination. However, it has been reported that coagulation, sedimentation and filtration, as currently practiced, are inadequate for treating water having densities of coliform organisms in excess of approximately 50 per 100 ml. When this situation arises it is imperative that an additional treatment step, such as we have discovered and described herein, be carried out to reduce the concentration of the bacterial and viral contaminants to a level safe for human consumption.

The importance of our process is ascertained by a consideration of the various diseases that can be traced to contaminated water. Evidence is sufficiently complete to warrent recognition of water-borne transmission as the mode of spread of infectious hepatitis. Such a route has also been postulated for poliomyelitis. Many bacteria-caused illnesses such as typhoid fever and dysentery are incurred by drinking contaminated water.

Surface active agents as contaminants in water do not directly cause disease or illness to humans who drink water containing them; however, as stated previously, these materials do interfere with certain standard purification procedures with the resultant possibility of increased concentrations of virus or bacteria passing the particular purification point. For example, high surfactant concentrations interfere with the settling of conventional flocculants, so that optimum efficiency of the coagulant is not obtained. Certain contaminating materials are dispersed, suspended or emulsified by the very nature of the surfactant's properties. Exceptionally high concentrations of surfactant are ordinarily required before the taste of the water is affected adversely, but a foreign material suspended due to the dispersing power of a surfactant may cause objectionable tastes to drinking water. Further undesirable effects of surfactants in water used for household purposes include the foaming apparent in water collected from a water tap. A glass of drinking water topped by a layer of foam is naturally offensive to one's aesthetic senses.

Many methods of application of the hydrophilic polyelectrolyte to contaminated water to effect purification will be apparent to one skilled in the art. The instant invention is not limited to any particular method of contacting the polyelectrolyte with the water to be purified, nor is the invention limited to the representative methods described herein for illustrative purposes.

For a broad spectrum system effective in the removal of many varied microorganisms and contaminating compounds we prefer to contact the water with a polyelectrolyte which contains both positive and negative charges, i.e., polyampholytes, although we have found that in certain instances we prefer to employ a polyanionic or polycationic material. We have demonstrated the preparation and activity of these various polymeric derivatives in the examples.

It will be understood that the variables in connection with the polyelectrolyte's state of subdivision, ultimate particle size, amount of cross-linking in the basic copolymer, and hydrophilic-hydrophobic balance depend upon the method to be used for contacting the polyelectrolyte and the contaminated water. It is within the skill of the polymer chemist to fix these variables by routine experimentation. For example, if a comparatively low molecular weight polymer having a high proportion of hydrophilic groups is employed, a higher degree of cross-linking is needed to maintain water-insolubility.

Although our hydrophilic polyelectrolytes can be added to water along with the flocculants normally employed, it is oftentimes more desirable to pre-treat the water with a flocculation-sedimentation-filtration step prior to contacting the water with our polyelectrolytes. The hydrophilic copolymer derivative can be added to the water with agitation, and then the water filtered or the polyelectrolyte-contaminant permitted to settle. A suitable finely divided earth or clay, e.g., diatomaceous earth, can be added to enhance aggregation and to promote settlement of the complex containing the contaminants.

Another advantageous method of contacting contaminated water with our preferred hydrophilic polyelectrolytes involves the filtration or percolation of water through a bed or column of the polyelectrolyte. For example, a finely divided inert material can be coated with the copolymer derivative. Another method of preparing a useful filter medium consists of chemically reacting a portion of the functional groups of the polyelectrolyte with the material composing the filter, e.g., the hydroxyl groups of a cellulosic filter medium can be used to esterify part of the carboxylic groups of the copolymer. The carboxylic acid groups of the copolymer can also react with the

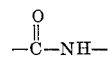

groups of nylon.

As an example of the method of treating water wherein the hydrophilic polyelectrolyte is chemically bound to a filter medium, the following technique can be employed. Cellulosic filter cloth can be saturated with a solution of the half-amide-half ammonium salt of styrene-maleic anhydride copolymer and reaction between the cloth and copolymer brough about by thermal curing at 100–150° for 1 to 6 hrs. The polymer pickup by the cloth can be varied from about 1 to 10% of the weight of cloth by control of polymer dilution, pressing, after rinse, etc. The contaminated water can then be filtered through multiple layers of this treated cloth to effect adsorption of the contaminants. The filter medium can be regenerated by treatment with brine or steam and reused. The regeneration treatment does not chemically alter the polyelectrolyte but removes the adsorbed contaminants, e.g., brine interferes with the electrostatic bonds holding the viruses or bacteria to the polyelectrolyte.

Water purification, according to our invention, can be carried out on a continuous basis by the use of polyelectrolyte packed columns. One preferred type of operation involves backflow operation wherein solid polyelectrolyte is fed to the top of the column, contaminated water is fed to the bottom of the column and saturated polyelectrolyte is withdrawn from the bottom of the column and cycled to an activation or regeneration step or else discarded. The contaminated water flows countercurrent to the polyelectrolyte flow, entering the bottom of the column and passing out of the top of the column in a purified state. Further modifications of columnar operation involving combinations of parallel and/or series-related columns are possible and well within the scope of this invention.

In place of absorbents prepared by coating an inert substrate with a hydrophilic polyelectrolyte we can use adducts having an electrostatic or chemical bond between the copolymer derivative and a clay. Clays suitable for this purpose include the bentonites, montmorillonites, kaolins, and attapulgites. The copolymer derivatives having an amino function are particularly valuable in preparing these clay adducts which can then be added to the water or they can be used as filter media or as packing for a column.

Although much of this specification has been directed to methods of purification applicable to municipal water treatment plants, it is within the scope of this disclosure and invention to purify drinking water in individual homes. Purification cartridges can be constructed to fit home-type water spigots so that the water passes through a column or bed of the hydrophilic polyelectrolyte contained in the cartridge. These individual containers could be constructed of disposable materials or they could be of a type wherein the copolymer drivative was periodically replaced with fresh absorbent. This system would enable individual consumers to insure that they were obtaining drinking water substantially free of virus and microorganisms even during the periods of temporary overload at the central water treatment plant.

Our novel process can also be used in the treatment of the effluent from a hospital. The hospital wastes can be passed through a primary sedimentation step and then through a bed or packed column of the hydrophilic polyelectrolyte as described above. Alternately the effluent can be treated in one stage wherein the polyelectrolyte is added along with a coagulant or flocculent. It is desirable to treat all hospital effluent prior to discharge to the public sewer system to remove harmful viruses and other contaminants at their origin before they enter a watercourse.

Many infectious diseases are spread by air-borne viruses. Although methods have been devised for filtering and scrubbing contaminants such as dust, pollen and odors from air, methods have not been previously devised for positively removing viruses from air.

We have found that our preferred hydrophilic polyelectrolytes are particularly suitable for adsorption of viruses, bacteria and other microorganisms, from air. This processing step greatly decreases the rate of disease transferrence by air routes. The air-treatment step is important in areas with a high incidence of contamination, e.g., hospitals, doctors' offices, factories, schools, nurseries, office buildings, and homes. The contact of air-borne infectious matter with the hydrophilic polyelectrolyte can be achieved with modifications to equipment used for air circulation or for air conditioning. Air can be passed over dry polyelectrolyte surfaces or can be contacted with the polyelectrolyte in a scrubbing system. A filter medium of the conventional filter-mat type especially useful in the dry type operation but having about 100 times the surface area of conventional ion exchange resins can be made from polymers of the invention by a solvent-cast uncollapsed film technique, (Craig, J. P., Knudsen, J. P. and Holland, V. F.; characterizations of Acrylic Fiber structure, Textile Research Journal, 32, No. 6, 435–448 (1962). In the scrubbing system the finely divided particles of polyelectrolyte can be added to the scrubbing bath, or polyelectrolyte can be deposited on an inert substrate and used in the wet filtering system. When adsorptive capacity of the polyelectrolyte is reached, the adsorbed contaminants, germs, etc., can be removed by destroying the infectious matter by steam or autoclave treatments or, alternatively, the polyelectrolyte can be washed with a dilute brine or acidic solution to loosen and wash away the contaminants.

These and other aspects of the practice of our purification process will be readily understood by those skilled in the art after reviewing our complete specification. In order to illutrate some of the various aspects of the invention and to serve as a guide in applying the invention, the following specific examples are given. It will of course be understood that variations in the particular copolymers and their derivatives, method of application, and conditions for use can be made without departing from the invention.

EXAMPLE 1

This example illustrates the preparation of a typical maleic acid/$C_2$–$C_{12}$ monoolefin copolymer useful in the preparation of active adsorbent derivatives. A 3-liter glass reactor, fitted with reflux condenser and motor-driven stirring device was charged with 52.3 g. of maleic anhydride, 55.7 g. of styrene, 1500 ml. of benzene, 2.53 g. of 55% active divinyl benzene, equivalent to 1.39 g., or 1 mol percent of active cross-linking agent, and 0.275 g. of benzoyl peroxide. The reactants are heated to the temperature of refluxing benzene and maintained at this temperature with good mixing for 3.5 hours. The polymer was filtered, washed upon the filter with benzene and finally dried in the vacuum oven for 16 hours at 100° C. An essentially quantitative yield of cross-linked styrene/maleic anhydride copolymer was obtained.

EXAMPLE 2

A predetermined percentage of anhydride groups in the maleic anhydride copolymer, such as prepared in Example 1, can be converted to substituted imide groups by a simple two-step process. To prepare a product containing 50% imide linkages, 0.5 molar unit of styrene maleic anhydride polymer from Example 1, was charged to a glass 1 liter reactor fitted with mechanical stirrer and graduated water trap topped by a reflux condenser. The reactor was then charged with 500 ml. dry xylene and 0.25 mol of a dialkyl-aminoalkylamine added. A representative amine of this class is the dimethylaminopropylamine. As the reactants were gently warmed with good mixing, the anhydride linkage was opened and the N-substituted amide formed. Heating was continued and the temperature raised to reflux the xylene and to carry off azeotropically the water of reaction as the imide linkages formed.

After the theoretical quantity of water had been distilled from the reactor, the solvent was stripped off under reduced pressure and the product copolymer derivative dried in a vacuum oven.

EXAMPLE 3

The copolymer from Example 2 containing 50% substituted imide linkages is suitable for purifying water by our process. For certain applications a copolymer having a percentage of quaternary salt hydrophilic groups can be prepared by reacting the substituted imide with an alkyl halide. It is possible to convert a calculated proportion of the tertiary nitrogen atoms to quaternary nitrogen atoms by the simple method of warming a suspension of the polymer with a calculated amount of alkyl halide. An inert diluent such as benzene can be employed for the preparation of the quaternary ammonium derivatives. A calculated weight of the imide substituted copolymer, as prepared in Example 2, was suspended in benzene to which was added an alkyl halide. The reaction proceeded readily at temperatures from 40 to 60° C. when a halide such as methyl iodide was employed. A reaction period of 30 minutes or less is usually sufficient when an active halide such as a benzyl halide or a lower alkyl halide is employed. If the halide be a chloride, the reaction time is somewhat longer than if the halide portion of the molecule be bromide or iodide. After the heating period was completed, the diluent was stripped off at reduced pressure and the polymer dried in a vacuum oven.

EXAMPLE 4

The hydrophilic properties of the various copolymers suitable for the practice of our invention can be increased by an ammoniation step. Ammonia gas is used to convert unreacted anhydride linkages in the copolymer to the half-amide, half-ammonium salt. This reaction can be carried out by adding ammonia to the dry polymer while using thorough mixing, or the ammonia can be added to a suspension of the copolymer in an inert diluent such as benzene. The ammoniation step has been successfully conducted using copolymer as prepared, or can be carried out with a derivative of the copolymer, e.g., copolymer containing imide linkages, copolymer containing substituted imide linkages, or copolymer containing quaternary ammonium compounds prepared from the partial imides.

The ammoniation reaction is accompanied by a temperature rise and proceeds rapidly to 100% conversion of the anhydride linkages. If the reaction is conducted with the dry polymer, excess adsorbed ammonia is stripped from the polymer by treating it under reduced pressure to remove the ammonia. If the ammoniation is conducted with a polymer suspension, excess ammonia is removed along with the inert diluent which is stripped off under reduced pressure.

EXAMPLE 5

A procedure was devised to measure the adsorptive power of the various polyelectrolytes without the need for time-consuming microbiological assay. Essentially the test method involves the addition of a weighed quantity of purified tobacco mosaic virus (TMV) to a water slurry of a weighed quantity of polymer. The mixture was buffered in preliminary tests with a standard phosphate buffer to pH 7 to minimize pH variations for a group of test polyelectrolytes. After mixing by means of a gyrating shaker for a definite time, which was studied over intervals of 1 to 24 hours, the polymer was filtered off.

To the filtrate was added Folin's phenol reagents, which gives a characteristic blue color with TMV. The color intensity was determined by means of a spectrophotometer, and the value read against a standard curve to give the concentration of TMV in the filtrate. Thus the percentage of TMV adsorbed by the polyelectrolyte could be calculated. Each series of tests was run in the presence of a control which was processed in an identical manner except that no polyelectrolyte was present. By this test procedure the following results were obtained.

(A) A sample of styrene-maleic anhydride copolymer crosslinked with 1 mole percent active divinylbenzene (Example 1) was processed to convert 50% of the anhydride groups to the imide configuration with dimethylaminopropylamine. A sample of this product passing through a 250 mesh screen, 0.25 mg., was shaken with 0.95 mg. TMV in 5 ml. water for 20 hours at room temperature. This product adsorbed 89% of the TMV under the test conditions.

(B) A sample of the product from 5-A above containing 50% imide linkages was converted to the quaternary ammonium salt by reaction with methyl iodide. This product was insoluble in water and was tested for absorption of TMV by use of the quantities of materials and conditions as reported in 5-A above. This material removed 87% of the virus from the water.

(C) The quaternary ammonium compound from 5-B was further reacted with gaseous ammonia at room temperature to open the anhydride links in the crosslinked styrenemaleic anhydride copolymer. This reaction results in the formation of the half-amide, half-ammonium salt. There was no water-soluble polymer in the resulting product. The quantities of polymer and TMV as used in 5-A were mixed under the identical testing conditions of 5-A and 5-B. This product absorbed 96% of the TMV from the water.

EXAMPLE 6

Another series of derivatives of a styrene-maleic anhydride copolymer, crosslinked with 1 mole percent active divinylbenzene, was evaluated. The copolymer was prepared according to the procedure of Example 1 and converted to hydrophilic polyelectrolytes as described herein. In each adsorption test, a quantity of 8 mg. of copolymer that passed through a 250 mesh screen was shaken with 0.9 mg. TMV in 5 ml. water for 20 hrs. at 20° C. This is a higher ratio of polyelectrolyte to TMV than was employed in the Example 5 series.

(A) The styrene-maleic anhydride copolymer was heated with a quantity of dimethylaminopropylamine to convert 50% of the anhydride groups to imide groups having a pendant group containing a tertiary amino linkage. This product adsorbed 98% of the TMV under the above-described test conditions.

(B) The free amino derivative of 6-A was treated with ammonia gas to prepare the half-amide, half-ammonium salt from the anhydride groups. This product adsorbed 97% of the TMV from water under the above test conditions.

(C) A quaternary nitrogen compound was prepared by treating the tertiary amino derivative of 6-A with methyl iodide. This material was water insoluble and effectively adsorbed 95% of the TMV from water under the above-described test conditions.

(D) A quantity of the quaternary nitrogen derivative of 6-C was treated with gaseous ammonia to open all of the anhydride linkages in the polymer. This polymeric compound thus was characterized by having imide groups having a pendant group containing a quaternary nitrogen atom, and having amide linkages attached to the carbon-carbon backbone and also the ammonium salt of a carboxylic acid attached to this backbone. This strongly hydrophilic polymer was water insoluble and it adsorbed 97% of the TMV from water under the above test conditions.

(E) A separate sample of the 50% imide from 6-A was hydrolyzed by stirring it in water for 20 hours at 60° C. This run was calculated to convert substantially all of the anhydride groups to free dicarboxylic acids. This treatment did not render the copolymer water soluble although its hydrophilic character was improved. This product adsorbed 99% of the TMV from water under the above test conditions.

EXAMPLE 7

This example demonstrates that variations in polymer cross-linking and type of hydrophilic groups can be made without adversely effecting the viral adsorption capacity of the polyelectrolyte. Each of the derivatives in this series was screened to select polymeric material that passed through a 250 mesh screen. A 8 mg.-sample was then shaken with 0.9 mg. TMV in 5 ml. water for 20 hours at room temperature and the quantity of unadsorbed TMV determined colormetrically as described above.

A styrene-maleic anhydride copolymer was prepared according to the procedure of Example 1 but with the exception that one-half mole percent of divinylbenzene was employed, in place of the 1 mole percent of Example 1, based on total monomers charged. This copolymer was used to prepare a series of polyelectrolytes for viral adsorption studies.

(A) The copolymer was heated with a quantity of dimethylaminopropylamine sufficient to convert 50% of the anhydride linkages to imide linkages containing a pendant group having a tertiary nitrogen atom in the chain. This material absorbed 99% of the TMV from the water under the above test conditions.

(B) A sample of the copolymer derivative from 7–A was further ammoniated as previously described. This reaction resulted in the conversion of all the anhydride links in the chain to the half-amide, half-ammonium salt. This product removed 100% of the TMV from the water under the test conditions, and no trace of TMV could be detected in the filtrate after filtering off the polymer with the adsorbed TMV.

(C) A separate sample of the 50% imide derivative as a benzene slurry, from 7–A, was converted to the hydrochloride salt of the tertiary amine with gaseous hydrogen chloride. Excess hydrogen chloride was removed under reduced pressure as the benzene was stripped from the product. This hydrophilic polyelectrolyte was water insoluble, and had a high degree of activity in adsorbing TMV from water as 97% was adsorbed under the above test conditions.

(D) The pendant tertiary amino groups in the copolymer, as described in 7–A, where converted to quaternary nitrogen derivatives by reaction with methyl iodide. This copolymer derivative, while having strong hydrophilic groups, retained its water insoluble characteristics. It adsorbed 98% of the TMV under the test conditions reported above.

(E) A separate sample of the copolymer derivative containing quaternary nitrogen atoms in the pendant imide linkage (7–D) was treated with ammonia gas. Excess ammonia was removed under reduced pressure along with benzene which was used to prepare a slurry of the polymeric material. The ammonia converted the anhydride groups to the half-amide, half-ammonium salt. This ammoniated, quaternary derivative was water insoluble and effectively adsorbed 97% of the TMV under the conditions reported above.

EXAMPLE 8

A styrene-maleic anhydride copolymer was prepared in the presence of one-half mole percent of divinylbenzene as described in Example 7. This cross-linked material was heated with dimethylaminopropylamine in xylene in a calculated attempt to convert ⅔ of the anhydride linkages to imide linkages. A quantity of the copolymer equivalent to 3 times the unit molecular weight was thus heated with a quantity of amine equivalent to 2 times the molecular weight of the amine. The product contained 6.67% nitrogen indicating a conversion to imide linkages of 60.2%. A portion of this product was screened and the material passing through a 250 mesh screen and retained on a 270 mesh screen was tested for viral adsorption properties. In the adsorption test, 2 mg. of this polyelectrolyte was shaken with 0.8 mg. TMV in 5 ml. water for 10 hours at 25° C. After the polymer was filtered off it was determined that the filtrate contained but 2% of the TMV initially charged, thus 98% of the TMV was adsorbed on the polyelectrolyte.

EXAMPLE 9

A sample of the copolymer derivative from Example 8 was treated with ammonia gas under anhydrous conditions at room temperature to open the anhydride linkages, thus converting them to the half-amide, half-ammonium salt. The ammoniated product was stored in a vacuum oven for 48 hours to remove adsorbed free ammonia. This hydrophilic polyelectrolyte was water insoluble, although it was slightly swollen by water. In a test of its adsorption of TMV, conducted under the identical conditions of Example 8, this copolymer derivative adsorbed 100% of the TMV from the water, thus leaving no trace of TMV in the water after filtration.

EXAMPLE 10

A separate sample of the copolymer derivative of Example 8 was reacted with a quantity of methyl iodide, equivalent to the analyzed quantity of tertiary nitrogen atoms in the pendant imide substituent. The quaternary ammonium derivative formed readily at 40–45° C. in a benzene slurry. The diluent was stripped off under reduced pressure and the dried polyelectrolyte that passed a 250 mesh screen and was retained on a 270 mesh screen was selected for an adsorption test under severe conditions. A 1 mg. quantity of the polyelectrolyte, which was water insoluble, was shaken for 5 hours with 0.8 mg. TMV in 5 ml. water at 25° C. It was determined that 97% of the virus was adsorbed from the water under these conditions.

EXAMPLE 11

A sample of styrene-maleic anhydride copolymer containing ½ mole percent of divinylbenzene as a cross-linking agent (Example 7) was used to prepare another polyelectrolyte. A molar unit quantity of the copolymer was heated with a 10% equivalent molar excess of dimethylamino propylamine in refluxing xylene for 4.5 hours while the water of reaction was collected in a Dean and Stark trap. The mixture was cooled and transferred to a large beaker containing hexane. The insoluble product was washed several times with fresh hexane by a decantation technique. The product was finally filtered and dried for 16 hours in a vacuum oven at 100° C. Although the conversion to 100% imide linkages had been complete, as determined by measurement of collected water of reaction, the nitrogen analysis indicated that the imide content was 94.7% (9.42% nitrogen). This polyelectrolyte adsorbed 99% of the virus when shaken with TMV in the same proportion, and under the same conditions of test as described in Example 10.

EXAMPLE 12

It has been established that the hydrophilic polyelectrolytes suitable for the process of this invention vary in their degree of effectiveness in adsorbing contaminants from water. Their efficiency depends on the effective surface area of the polyelectrolyte particle, and this area is dependent upon the state of subdivision and on the particular polymerization technique employed to produce the copolymeric starting material. Furthermore, there is some variation in adsorption efficiency due to the nature and distribution of the hydrophilic groups attached to the polymer backbone, and to the relative proportion of hydrophilic groups to hydrophobic groups of the polymer chains. Adsorption efficiency also depends upon the physical method of contacting the contaminated water with the polyelectrolyte, and here it is necessary to provide conditions which statistically insure that the contaminant be brought within the effective distance wherein the adsorbent can exert its attractive force.

A series of test runs was conducted to demonstrate the variations of polyelectrolyte efficiency with variations in certain of the above-mentioned factors. A styrene-maleic anhydride copolymer prepared in the presence of ½ mole percent of divinylbenzene (Example 7) was used to prepare test derivatives as previously described. The adsorption data are summarized in Table I, wherein the conversion to the imide derivative are listed for the materials based on the calculated imide content.

TABLE I.—VIRUS ADSORPTION PERCENT

| Weight ratio-TMV/polyelectrolyte | 0.04[1] | 0.79[1] | 0.27[1] | 3.50[2] |
|---|---|---|---|---|
| Polyelectrolyte: | | | | |
| 66.7%, imide derivative: | | | | |
| a. Free tert. amine | 98 | 77 | 36 | 10 |
| b. Ammoniated amine | 100 | 93 | 42 | 22 |
| c. Methiodide | | 97 | 86 | 48 |
| 100% imide derivative: | | | | |
| a. Free tert. amine | 88 | 99 | 99 | 30 |
| b. Methiodide | | 80 | 100 | 100 |

Adsorption test conditions:
[1] Polymer screened through 250, collected on 270 mesh screen; contact-shaken with TMV for 24 hours at 28–30° C.
[2] Polymer screened through 325 mesh screen; contact-shaken with TMV for 1 hour at 28–30° C.

In certain situations relating to removal of contaminants from water, according to the instant process, it may be desirable to recycle the adsorbent copolymer derivative after a regeneration step. In other situations it may be desired to collect the contaminating material for examination and study. It is additionally desirable to observe the activity of the adsorbent in the presence of other chamicals, e.g. ionic compounds or proteins. The following tests illustrate the activity of representative hydrophilic polyelectrolytes in removing specific contaminants in the presence of other foreign substances.

EXAMPLE 13

A sample of styrene-maleic anhydride copolymer prepared in the presence of ½ mole percent of divinylbenzene (Example 7) was converted to the calculated 100% imide by heating with excess dimethylaminopropylamine and purified as previously described. The tertiary nitrogen atoms in the resulting imide substituent were then converted to quaternary nitrogens with methyl iodide. This hydrophilic polymeric derivative was screened and the product that passed through a 325 mesh screen tested for adsorption activity as follows:

(A) A 0.5 mg. sample of the polyelectrolyte was shaken with excess TMV (weight ratio of TMV/polyelectrolyte of 1.84) in water at 28–30° C. for 1 hour. After filtration it was determined that no TMV remained in the filtrate, thus 100% of the TMV had been adsorbed.

(B) In a test conducted under the same conditions as 13–A above, the polyelectrolyte and TMV were shaken in a 1% sodium chloride solution. All other conditions were identical. It was found that the polymer derivative adsorbed 97% of the TMV.

(C) The polymer derivative containing adsorbed TMV from 13–B above was removed from the filter and transferred to a clean vial containing 5 ml. of 1 molar sodium chloride solution. The materials were shaken for 1 hr. at 28–30° C. and again filtered. It was determined that 52% of the adsorbed virus was eluted during this step. Thus, the copolymer derivative can operate to remove contaminants in the presence of inorganic ions, and yet, if desired, the viral contaminants can be removed from the adsorbent by an elution process at high ion strengths.

(D) A sample of the same hydrophilic polyelectrolyte tested in 13–A and 13–B was selected for this test of virus adsorbent power in the presence of foreign (nonviral)protein. A 2 mg. sample of the polymeric derivative was shaken with 2.5 mg. of TMV and 50 mg. bovine serum albumin in 5 ml. water for 1 hour at 30° C. The mixture was then filtered, and the filtrate compared in the Spinco Analytical Ultracentrifuge with a sample of TMV treated in the identical manner but without the polyelectrolyte or bovine serum albumin being present. It was determined that approximately 90% of the TMV had been adsorbed, based on a comparison of the relative areas under the two peaks. A check of the filtrate with Folins reagent showed that 90% of the bovine serum albumin was still present. This result indicates a selective virus removal from solution containing 20 times as much foreign protein.

EXAMPLE 14

This example shows the efficiency of the hydrophilic polyelectrolytes in removing dissolved surface active agents from water. An aqueous solution of sodium dodecylbenzene sulfonate was prepared to give a concentration of 10 p.p.m. of this representative surfactant. Clean flasks were charged with 100 ml. of this detergent solution and 0.25 g. of copolymer derivative added and the flasks sealed. Agitation of the mixture was carried out on a rotary shaker for 20 hours at room temperature, the polymer was removed by filtration, and the filtrate analyzed for the sulfonate by means of the Eptonmethylene blue titration procedure. The following results were obtained:

(A) The hydrophilic polyelectrolyte tested was obtained by preparing the calculated 100% imide derivative of a styrene-maleic anhydride copolymer containing ½ mole percent divinylbenzene as a cross-linking agent. The imide prepared by heating the copolymer with excess dimethylaminopropylamine, was screened through a 325 mesh screen, as previously described. The filtrate in this adsorption test contained 0.09 p.p.m. of the surfactant initially charged; thus, over 99% of the surfactant was adsorbed and removed from solution.

(B) The copolymer derivative in 14–A was converted to the quaternary ammonium derivative with methyl iodide. After purification, a 0.25 g. sample of the product that passed through a 325 mesh screen was used for the test. In this instance the filtrate contained 0.24 p.p.m. of surfactant; thus, 98% of the detergent material initially present was adsorbed and removed from the water.

EXAMPLE 15

The effects of the hydrophilic polyelectrolytes in our water purification process is probably due to a combination of adsorption processes plus the pronounced activity of the materials in the inhibition of viral growth. The copending application of Dr. William Regelson, Ser. No. 197,937, filed May 28, 1962, the disclosure of which is incorporated herein by reference, illustrates the surprisingly high activity of the hydrophilic polyelectrolytes in the inhibition of viral growth and in the inactivation of viruses so as to prevent their propagation.

The cytopathogenicity in monkey and hamster kidney cell cultures by Echo 9 virus and Semliki Forest virus was prevented by exposure of the viruses to the amide-acid and hydrolyzed derivatives of ethylene-maleic anhydride copolymers. Cytopathogenicity could be prevented or delayed by the direct addition of the polyelectrolyte copolymers during the initial incubation of virus in the tissue culture cells (i.e., up to 26 hours after inoculation of Echo 9 virus).

EXAMPLE 16

This example describes the removal of polio virus from water using polymers of the invention. The type 1 polio virus used in these experiments was prepared as follows: In the first three steps which are described below were performed on consecutive days. To 32 ounce bottles of KB cells (clone KB 1) were infected with 1 ml. of undiluted stock. These KB cells are serially propagated cells derived from malignant tissue, epidermoid carcinoma of the nasal pharynx (H. Eagle, Proc. Soc. Exp't. Biol. Med., 89, 362–364, 1955). Complete destruction of the cell sheet was observed The virus was harvested and frozen in two 35 ml. aliquots, one 35 ml. portion was thawed and shaken for two minutes with equal parts of trifluorotrichloroethane to extract foreign protein and was centrifuged at 1500 r.p.m. for ten minutes. The aqueous phase (29 ml.) was centrifuged at 28,000 r.p.m. for two hours. The small gelatinous pellet was resuspended in 2.8 ml. of sterile distilled $H_2O$ (10× conc. virus). The suspension was smooth and slightly turbid. Following low-speed centrifugation for five minutes, the final supernatant was used for polymer adsorption studies.

The polymers were contacted with virus as follows: Polymer (100 mg.) was suspended in 4.5 ml. of distilled $H_2O$ immediately before addition of the virus sample. The control consisted of 4.5 ml. of distilled $H_2O$. To each sample was added 0.5 ml. of the virus suspension. Virus-polymer mixtures and controls were shaken on a gyratory shaker at room temperature for one hour. After shaking all samples were filtered through filter paper. Filtrates were assayed for virus by plaque titration.

The virus was assayed as follows: KB cell monolayers in 5 cm. plastic Petri dishes were prepared one day previously from KB 1 spinner cultures. Appropriate virus dilutions were made in tris- and phosphate-buffered bovine albumin solution, ph 7.0 One-half milliliter of each dilution was placed on each of two plates which were then incubated for two hours at 37° C. and overlaid with 5 ml. of neutral red neutrient agar.

The data from these tests are summarized in Table II below. In this table comparison is made with the control sample showing the original concentration of polio virus, with two polyelectrolytes of the invention, and with a commercially available anion exchange resin. The two polyelectrolytes of the invention are two of the polymers which are shown in Table I.

TABLE II.—POLIO VIRUS REMOVAL

| Treatment | PFU/ml. | Percent virus removal |
|---|---|---|
| Example number Polyelectrolyte: | | |
| Control | $1.6 \times 10^8$ | |
| 9 — 66.7% imide derivative-free tert. amine. ammoniated. | $<1 \times 10^5$ | >99.9 |
| 11 — 100% imide derivative-free tert. amine. | $<1 \times 10^5$ | [2] >99.9 |
| Amberlite XE-119 [1] | $1.6 \times 10^8$ | 0 |

[1] This is a commercially available anion exchange resin frequently used for biological adsorptions.
[2] At maximum virus concentration tested no plaque-forming units (PFU) were observed.

It is clear from the data of Table II that the polyelectrolytes of the invention are doing a very excellent job of polio virus removal from water as compared to no removal by the ion exchange resin.

The data of Table II illustrates some particularly desirable polymers useful in the process of the invention, and quaternary salts of these polymers are also excellent for use in the process of the invention. These polymers are broadly defined on page 15, lines 1–15, limited to the extent that at least 50% of X and Y are taken together to form an >NR radical wherein R is an alkyl radical of not more than 18 carbon atoms containing a tertiary nitrogen atom or an alkyl radical of not more than 18 carbon atoms containing a quaternary nitrogen atom. See also Example 3 above.

EXAMPLE 17

Preparation of partial dimethylaminopropyl imide, partial butyl imide derivative of crosslinked isobutylene maleic anhydride copolymer Xylene (1 liter) is charged to a reaction vessel equipped with reflux condenser, Dean-Stark water trap and stirrer. Methylimino-bis-propylamine (1.45 grams) and 1:1 molar copolymer of isobutylene-maleic anhydride (38.5 grams) are added with stirring. The stirred mixture is heated to reflux temperature (140° C.) and is maintained at said temperature for 1 hour. Upon completion of the 1 hour period, dimethylaminopropyl amine (6.38 grams) is added over a three hour period, during which period reflux temperature is maintained. To the resulting reaction mixture is then added butylamine (13.7 grams). Reflux of the reaction mixture is continued for three additional hours. It is then cooled and filtered. The solid product is washed with hexane and dried. The partial dimethylaminopropyl imide, partial butyl imide derivative of crosslinked isobutylene maleic anhydride copolymer is obtained.

EXAMPLE 18

Preparation of partial ester aminoamide, partial dimethylaminopropyl amide, partial dimethylaminopropyl imide derivative of cross linked ethylene-maleic anhydride copolymer Xylene (1 liter) is charged to a reaction vessel equipped with reflux condenser, Dean-Stark water trap and stirrer. Methylimino-bis-propylamine (2.9 grams) and 1:1 molar copolymer of ethylene-maleic anhydride (63.0 grams) are added with stirring. The stirred mixture is heated to reflux temperature (140° C.) and is maintained at said temperature for 1 hour. Upon completion of the 1 hour period dimethylaminopropyl amine (12.75 grams) is added over a three hour period during which period reflux temperature is maintained. The mixture is cooled to 90° C. and additional dimethylaminopropyl amine (12.75 grams) is added. The temperature is maintained at 90° C. for 3 hours. Butanol (18.5 grams) is then added and the temperature is maintained at 90° C. for an additional 2 hour period. The reaction mixture is then cooled and filtered. The solid product is washed with hexane and dried. The partial ester aminoamide, partial dimethylaminopropyl amide, partial dimethylaminopropyl imide derivative of crosslinked ethylene maleic anhydride copolymer is obtained.

EXAMPLE 19

Preparation of partial dimethylaminoethyl ester, partial diamethylaminobutyl imide derivative of crosslinked 2-methylpentene-1/maleic anhydride copolymer Xylene (1 liter) is charged to a reaction vessel equipped with reflux condenser, Dean-Stark water trap and stirrer. Methylimino-bis-propylamine (2.9 grams) 1:1 copolymer of 2-methylpentene-1/maleic anhydride copolymer (92.0 grams) and diethylaminobutyl amine (7.2 grams) are added with stirring. The stirred mixture is heated to reflux temperature (140° C.) and maintained at said temperature for 1 hour. The mixture is cooled to 100° C. and dimethylaminoethanol (45.0 grams) is added. The temperature of the reaction mixture is maintained at 100° C. for 5 hours. It is then cooled and filtered. The solid product is washed with hexane and dried. The partial dimethylaminoethyl ester, partial diethylaminobutyl imide derivative of crosslinked 2-methylpentene-1/maleic anhydride copolymer is obtained.

EXAMPLE 20

Preparation of water-insoluble cross-linked isobutylene-maleic anhydride copolymer containing diloweralkyl-aminoloweralkylimide groups To a 5 liter glass reactor fitted with reflux condenser, dropping funnel, thermometer and motor driven stirring device were sequentially added xylene (2500 milliliters), isobutylene-maleic anhydride (IBMA) copolymer (354.2 grams) and a mixture of styrene (150 milliliters) and methyliminobispropylamine (14.75 milliliters). The resulting mixture was heated to the reflux temperature of xylene and maintained at that temperature with stirring for approximately one hour. The temperature of the mixture was then lowered to 100° C. and a mixture of dimethylaminopropylamine (14.25 milliliters) and xylene (150 milliliters) were added thereto. The temperature of the mixture was then raised to the reflux temperature of xylene and maintained at that temperature for approximately 5 hours. After the heating period, the contents of the reactor were permitted to cool, the solid reaction product was allowed to settle and xylene was decanted. The thus separated solid reaction product was twice washed with hexane, filtered, and the solid reaction product was dried under vacuum in an oven at 50° C. Water-insoluble cross-linked isobutylene-maleic anhydride copolymer containing 5% dimethylaminopropylimide groups was obtained.

EXAMPLES 21-27

A series of runs substantially identical to that of Example 20 were carried out except for variations in the ratio of diloweralkylamino alkylamine to IBMA copolymer. Water-insoluble isobutylene-maleic anhydride copolymers containing dimethylaminopropylimide groups were obtained. The results are given in Table III.

TABLE III

| | IBMA (moles) | DMAPA (moles) | Percent diloweralkylaminoloweralkylimide in polymer |
|---|---|---|---|
| Example No: | | | |
| 21 | 0.75 | 0.075 | 9.0 |
| 22 | 0.75 | 0.1125 | 14.5 |
| 23 | 0.7 | 0.14 | 17.0 |
| 24 | 0.7 | 0.21 | 26.0 |
| 25 | 0.6 | 0.3 | 50.0 |
| 26 | 0.6 | 0.42 | 68.5 |
| 27 | 0.5 | 0.46 | 90.0 |

EXAMPLE 28

Preparation of water-insoluble cross-linked ethylene-maleic anhydride copolymer containing diloweralkylaminoloweralkylimide groups To a two-liter glass reactor fitted with reflux condenser, dropping funnel, thermometer and motor driven stirring device are sequentially added xylene (1000 milliliters), ethylene-maleic anhydride copolymer (126 grams) and methyliminobispropylamine (4.0 milliliters), the resulting mixture was heated to the reflux temperature of xylene and maintained at this temperature for approximately one hour. The temperature of the mixture was then lowered to 100° C. and a mixture of dimethylaminopropylamine (5.10 grams) and xylene (50 milliliters) were added thereto. The temperature of the mixture was then raised to the reflux temperature of xylene and maintained at that temperature for approximately four hours. After the heating period, the contents of the reactor was permitted to cool, the solid reaction product was allowed to settle and xylene was decanted. The thus separated solid reaction product was twice washed with hexane, filtered and the solid reaction product was dried under vacuum in an oven at 50° C. Water-insoluble cross-linked ethylene-maleic anhydride (EMA) copolymer containing 4.5% dimethylaminopropylimide groups was obtained.

EXAMPLES 29-35

A series of runs substantially identical to that of Example 28 were carried out except for variations in the ratio of diloweralkylaminoloweralkylamine to EMA. Water-insoluble, cross-linked ethylene-maleic anhydride copolymers containing dimethylaminopropylimide groups were obtained. The results are given in Table IV.

EXAMPLE 36

The sodium salt of partial dimethylaminopropyl imide derivative of cross-linked ethylene-maleic anhydride is produced upon addition of sodium hydroxide to water containing partial dimethylaminopropylimide derivative of cross-linked ethylene-maleic anhydride.

TABLE IV

| | EMA (moles) | DMAPA (moles) | Percent diloweralkylaminoloweralkylimide in polymer |
|---|---|---|---|
| Example No: | | | |
| 29 | 1 | 0.10 | 9.5 |
| 30 | 1 | 0.15 | 13.5 |
| 31 | 1 | 0.20 | 19.2 |
| 32 | 0.75 | 0.225 | 27.0 |
| 33 | 0.75 | 0.375 | 45.5 |
| 34 | 1.5 | 1.05 | 69.5 |
| 35 | 0.5 | 0.5 | 08.8 |

EXAMPLE 37

The calcium salt of partial dimethylaminopropylimide derivative of cross-linked ethylene-maleic anhydride is produced by adding partial dimethylaminopropylimide derivative of cross-linked ethylene-maleic anhydride to water containing calcium hydroxide.

EXAMPLE 38

Preparation of water-insoluble cross-linked 2-methylpentene-1-maleic anhydride copolymer containing diloweralkylaminoloweralkylimide groups To a 1 liter glass reactor fitted with reflux condenser, dropping funnel, thermometer and motor driven stirring device were sequentially added xylene (300 milliliters) and cross-linked 2-methylpentene-1-maleic anhydride copolymer (27.9 grams). The mixture was vigorously stirred to uniformly disperse the copolymer in the xylene. To the dispersion was then added dimethylaminopropylamine (0.93 milliliter) with stirring. The resulting mixture was heated to 100° C. and maintained at that temperature for approximately one hour. At the completion of the one hour period the temperature of the heated mixture was raised to the reflux temperature of xylene and maintained at that temperature for approximately four hours. After the heating period, the contents of the reactor was permitted to cool, the solid reaction product was allowed to settle and xylene was decanted. The thus separated solid reaction product was twice washed with hexane, filtered and the solid reaction product was dried under vacuum in an oven at 50° C. Water-insoluble cross-linked 2-methyl pentene - 1 - maleic anhydride (MPMA) copolymer containing 4% dimethylaminopropylimide groups was obtained.

EXAMPLES 39-43

A series of runs substantially identical to that of Example 38 was carried out except for variations in the ratio of diloweralkylaminoloweralkylamine to MPMA. Water-insoluble cross-linked 2-methyl pentene-1-maleic anhydride copolymers containing dimethylaminopropylimide groups were obtained. The results are given in Table V.

EXAMPLE 44

(A) Preparation of styrene-itaconic anhydride copolymer

To a 12-liter glass reactor fitted with reflux condenser, dropping funnel, thermometer and motor driven stirring device were sequentially added styrene (156 grams), itaconic anhydride (168 grams), divinylbenzene (18.7 milliliters) and benzene (8000 milliliters). The resulting reaction mixture was heated to the reflux temperature of benzene at which time benzoylperoxide (0.545 gram) was added thereto. The reaction mixture was then maintained at the reflux temperature for three hours. On completion of the three hour heating period, the contents of the reactor were cooled and solid polymer was removed by filtration. The thus separated solid polymer was washed with benzene and filtered. The solid polymer was then washed in hexane, filtered and dried in an oven at 50° C. Styrene-itaconic anhydride copolymer (227.0 grams) was obtained. The polymer was shown by analysis to contain 35% styrene and 65% itaconic anhydride.

(B) Preparation of water-insoluble cross-linked styrene-itaconic anhydride copolymer containing diloweralkylaminoloweralkylimide groups

TABLE V

| | MPMA (moles) | DMAPA (moles) | Percent diloweralkylaminoloweralkylimide in polymer |
|---|---|---|---|
| Example No.: | | | |
| 39 | 0.15 | 0.015 | 10.0 |
| 40 | 0.15 | 0.0225 | 17.0 |
| 41 | 0.15 | 0.03 | 20.0 |
| 42 | 0.2 | 0.066 | 40.0 |
| 43 | 0.2 | 0.1 | 59.0 |

To a 3-liter glass reactor fitted with reflux condenser, thermometer and motor driven stirring device were sequentially added xylene (300 milliliters) cross-linked styrene-itaconic anhydride (33.5 grams) prepared in A above and dimethylaminopropylamine (1.12 milliliters) with stirring. The resulting mixture was heated to 100° C. at which time xylene (100 milliliters) was added thereto. The mixture was then heated to the reflux temperature of xylene and maintained at that temperature for approximately four hours. On completion of the four hour heating period, the contents of the reactor were cooled and then filtered to remove solid polymer. The separated material was twice washed in hexane, filtered and dried under vacuum in an oven at 50° C. Water-insoluble cross-linked styrene-itaconic anhydride containing 6% dimethylaminopropylimide groups was obtained.

EXAMPLE 45

Preparation of water-insoluble cross-linked isobutylene-maleic anhydride copolymer containing diloweralkyl-aminoloweralkylimide groups To a five liter glass reactor fitted with reflux condenser, dropping funnel, thermometer and motor driven stirring device were sequentially added xylene (100 milliliters), isobutylene-maleic anhydride (115.5 grams), methyl-iminobispropylamine (4.81 milliliters) and dimethyl-aminoproplyamine (2.8 milliliters). The resulting mixture was heated to the reflux temperature of xylene and maintained at that temperature for approximately four hours. After the heating period, the contents of the reactor were permitted to cool to room temperature, the solid reaction product was allowed to settle and xylene was decanted. The thus separated solid reaction product was twice washed with hexane, filtered and the said product was dried under vacuum in an oven at 50° C. Water-insoluble, cross-linked isobutylene-maleic anhydride copolymer containing 3% dimethylaminopropylimide groups was obtained.

EXAMPLE 46

This example shows the removal by adsorption of polio-virus from aqueous media using water-insoluble cross-linked polyelectrolyte polymers of the present invention containing in varying amounts the requisite diloweralkylaminoloweralkylimide group. The aqueous media were prepared by diluting polio-virus (Type 1) 100,000-fold in distilled water and then ten-fold further in the diluents shown in Table VI so that the final virus concentration was approximately 100–150 plaque forming units/0.1 milliliter (PFU/0.1 milliliter). The procedure employed in the test was carried out as follows:

100 milligrams of polyelectrolyte (PE) were suspended in three milliliters of aqueous medium. The suspension was agitated for approximately one hour, centrifugated at 2000 r.p.m. for five minutes and the resulting supernatant fluid was separated from the PE by decantation. The supernatant fluid was assayed for virus and then rated for virus content using the following rating system:

5=complete virus adsorption by PE, no PFU detectable in supernatant fluid (adsorption >90%);
4=75–90% adsorption of virus;
3=50–75% adsorption of virus;
2=25% average (10–50%) virus adsorption;
1=<10% adsorption by PE (substantially all virus found in supernatant fluid)

The ratings are given in Table VI.

The percent dimethylaminopropylimide groupings in the polymer is shown in the table. As a control the virus content in diluents which were not treated with PEs averaged 142 PFU/0.1 ml. (10%±).

Various modifications and equivalents will be apparent to one skilled in the art and may be made in the compounds, compositions, and methods of the present invention without departing from the spirit and scope thereof, and it is therefore to be understood that the invention is to be limited only by the scope of the appended claims.

TABLE VI

[Total Poliovirus Adsorbed on Polyelectrolytes in the Diluents Indicated]

| Maleic anhydride copolymer | Percent imide[1] | Distilled water | | 0.15M saline | | Earle's saline | | Phosphate buffer ($NaH_2PO_4$-$Na_2HPO_4$, 0.05M) | | |
|---|---|---|---|---|---|---|---|---|---|---|
| | | pH 6.8[2] | pH 8.2[3] | pH 6.8 | pH 8.2 | W/o. $HCO_3$ pH 6.8 | W. $HCO_3$ pH 8.2 | pH 6.0 | pH 7.0 | pH 8.0 |
| | | pH of PE-diluent-virus suspension. Values differ from pH of diluent used due to buffering action of added PE | | | | | | | | |
| Isobutylene | 5 | 5/7.4 | 5/7.4 | 5/6.4 | 1/7.4 | 5/6.4 | 5/7.4 | 5/6.0 | 2/7.0 | 1/8.0 |
| | 10 | 5/7.4 | 5/8.0 | 4/7.6 | 1/7.8 | 4/7.3 | 4/7.6 | 5/6.0 | 2/7.0 | 1/8.0 |
| | 15 | 5/7.5 | 5/7.8 | 4/7.8 | 1/7.8 | 3/7.5 | 3/7.8 | 5/6.0 | 1/7.0 | 1/8.0 |
| | 20 | 5/7.7 | 5/7.8 | 3/8.0 | 1/8.2 | 1/7.8 | 1/8.0 | 3/6.0 | 1/7.0 | 1/8.0 |
| | 30 | 3/8.0 | 5/8.0 | 1/8.0 | 1/8.0 | 1/8.0 | 1/8.0 | 1/6.0 | 1/7.3 | 1/8.0 |
| | 50 | 2/8.3 | 4/8.3 | 1/8.6 | 1/8.6 | 1/8.4 | 1/8.4 | 1/6.0 | 1/7.5 | 1/8.6 |
| | 70 | 1/8.3 | 4/8.4 | 1/8.6 | 1/8.6 | 1/8.5 | 1/8.6 | 1/7.0 | 1/8.0 | 1/8.5 |
| | 100 | 1/8.4 | 4/8.4 | 1/8.4 | 1/8.4 | 3/8.4 | 1/8.4 | 1/7.5 | 1/8.0 | 1/8.0 |
| 2-methyl pentene-1 | 5 | 4/7.0 | 1/8.5 | 5/7.0 | 1/8.5 | 5/6.0 | 1/7.8 | 5/6.0 | 2/7.0 | 1/8.0 |
| | 10 | 4/7.0 | 1/8.2 | 4/7.0 | 1/8.2 | 5/6.0 | 1/8.0 | 5/6.0 | 2/7.0 | 1/8.0 |
| | 15 | 5/6.0 | 1/8.2 | 4/6.5 | 1/8.2 | 5/7.0 | 3/8.0 | 5/6.0 | 3/7.0 | 1/8.0 |
| | 20 | 5/7.0 | 1/8.2 | 1/7.6 | 1/8.2 | 1/7.0 | 1/7.5 | 5/6.0 | 3/7.0 | 1/8.0 |
| | 30 | 5/7.5 | 5/8.5 | 1/7.5 | 1/8.5 | 1/7.5 | 1/8.0 | 1/6.0 | 1/7.0 | 1/8.0 |
| | 50 | 5/7.5 | 5/8.5 | 1/8.5 | 1/8.5 | 1/7.5 | 1/8.1 | 1/6.0 | 1/7.0 | 1/8.0 |
| | 70 | 5/7.5 | 3/8.5 | 1/8.0 | 1/8.5 | 1/7.5 | 1/8.5 | 1/6.0 | 1/7.0 | 1/8.0 |
| | 100 | 5/7.5 | 5/9.0 | 1/9.0 | 1/9.0 | 1/7.5 | 1/8.5 | 1/6.0 | 1/7.0 | 1/8.0 |
| Styrene | 5 | 5/6.0 | 1/7.5 | 5/5.5 | 1/7.0 | 5/5.5 | 1/7.2 | 5/6.0 | 4/7.0 | 1/8.0 |
| | 10 | 5/6.0 | 1/7.5 | 5/5.5 | 1/7.0 | 5/5.5 | 1/7.2 | 5/6.0 | 4/7.0 | 1/7.5 |
| | 15 | 5/6.5 | 5/7.0 | 5/5.5 | 4/6.0 | 5/5.5 | 5/6.0 | 5/5.5 | 5/6.5 | 2/7.0 |
| | 20 | 5/7.0 | 5/7.5 | 5/5.5 | 3/6.5 | 5/6.0 | 4/7.0 | 5/6.0 | 5/6.5 | 2/7.5 |
| | 30 | 5/7.5 | 5/7.5 | 1/6.0 | 1/7.0 | 1/6.0 | 1/7.0 | 1/6.0 | 1/7.0 | 1/8.0 |
| | 50 | 4/7.5 | 5/8.2 | 1/7.2 | 1/8.2 | 1/6.7 | 1/8.0 | 1/6.0 | 1/7.0 | 1/8.0 |
| | 70 | 5/8.0 | 5/8.5 | 1/8.5 | 1/8.5 | 1/8.0 | 1/7.8 | 1/6.0 | 1/7.0 | 1/8.0 |
| | 100 | 5/8.0 | 5/9.0 | 1/9.0 | 1/9.6 | 1/8.5 | 1/8.5 | 1/7.0 | 1/8.0 | 1/8.2 |
| Ethylene | 5 | 5/6.3 | 4/6.5 | 5/6.0 | 5/5.9 | 5/6.0 | 5/5.9 | 5/6.0 | 5/6.0 | 5/6.3 |
| | 10 | 5/6.8 | 5/7.0 | 5/6.5 | 5/6.5 | 5/6.0 | 5/6.0 | 5/6.0 | 4/6.5 | 2/6.8 |
| | 15 | 5/6.5 | 5/6.5 | 5/6.0 | 5/6.0 | 5/6.0 | 3/6.0 | 5/6.0 | 4/6.5 | 4/6.5 |
| | 20 | 5/6.5 | 5/6.8 | 5/6.0 | 5/6.0 | 5/6.0 | 5/6.0 | 5/6.0 | 5/6.0 | 5/6.0 |
| | 30 | 5/7.5 | 3/7.3 | 5/5.5 | 1/6.0 | 5/6.0 | 3/6.3 | 3/6.0 | 1/6.5 | 1/7.0 |
| | 50 | 5/8.3 | 1/8.3 | 1/7.0 | 1/7.5 | 1/7.0 | 1/7.5 | 1/6.0 | 1/7.0 | 1/7.5 |
| | 70 | 1/9.0 | 1/9.0 | 1/9.0 | 1/9.0 | 1/9.0 | 1/9.0 | 1/7.0 | 1/8.0 | 1/9.0 |
| | 100 | 1/9.0 | 1/9.0 | 1/9.0 | 1/9.0 | 1/9.0 | 1/9.0 | 1/9.0 | 1/9.0 | 1/9.0 |

[1] Dimethylaminopropylimide.
[2] pH of diluent before use.
[3] pH adjusted to 8.2 with a final concentration of 0.22% $NaHCO_3$.

What is claimed is:

1. A water-insoluble, cross-linked polyelectrolyte copolymer of (a) an unsaturated monomer of 2 to 12 carbon atoms and (b) a monomer selected from the group consisting of (1) a mixture of an unsaturated polycarboxylic acid or anhydride and an unsaturated polycarboxylic acid amine-imide, and (2) an unsaturated polycarboxylic acid amine-imide; provided at least three percent of the polymeric units of the polyelectrolyte contain an amine-imide group which group is a diloweralkylaminoloweralkylimide group wherein lower-alkyl has 1 to 5 carbon atoms inclusive, including acid addition and quaternary ammonium salts thereof, said polyelectrolyte having a molecular weight of at least 1000.

2. The polyelectrolyte of claim 1 wherein in addition to the requisite amine-imide group a carboxy, carboxy alkali metal, ammonium salt, amide or imide group is also present and wherein the number of polymeric units in the polyelectrolyte is at least 8.

3. The polyelectrolyte of claim 1 wherein the basic polymer chain is an ethylene-maleic anhydride copolymer chain.

4. The polyelectrolyte of claim 1 wherein the basic polymer chain is a styrene-maleic anhydride copolymer chain.

5. The polyelectrolyte of claim 1 wherein the basic polymer chain is an isobutylene-maleic anhydride copolymer chain.

6. The polyelectrolyte of claim 1 wherein the basic polymer chain is a 2-methyl pentene-1-maleic anhydride copolymer chain.

7. Polyelectrolyte of claim 1 comprising water-insoluble cross-linked styrene-maleic anhydride dimethylaminopropylamine imide methiodide copolymer.

8. Polyelectrolyte of claim 1 comprising water-insoluble cross-linked styrene-maleic anhydride dimethylaminopropylamine imide copolymer.

9. Polyelectrolyte of claim 1 comprising water-insoluble cross-linked styrene-maleic anhydride dimethylaminopropylamine imide hydrochloride copolymer.

10. Polyelectrolyte of claim 1 comprising water-insoluble cross-linked styrene-maleic anhydride dimethylaminopropylamine imide, half amide, half ammonium salt copolymer.

11. Polyelectrolyte of claim 1 comprising water-insoluble cross-linked styrene-maleic anhydride dimethylaminopropylamine imide methiodide, half amide, half ammonium salt copolymer.

12. Polyelectrolyte of claim 1 comprising water-insoluble cross-linked isobutylene-maleic anhydride dimethylaminopropylimide, butyl imide copolymer.

13. Polyelectrolyte of claim 1 comprising water-insoluble cross-linked ethylene-maleic anhydride dimethylaminopropylimide, dimethylaminopropylamide ester copolymer.

14. Polyelectrolyte of claim 1 comprising water-insoluble cross-linked 2-methyl pentene-1-maleic anhydride dimethylaminobutylimide, dimethylaminoethyl ester copolymer.

15. Polyelectrolyte of claim 1 comprising water-insoluble cross-linked ethylene-maleic anhydride dimethylaminopropylimide sodium salt copolymer.

16. Polyelectrolyte of claim 1 comprising water-insoluble cross-linked ethylene-maleic anhydride dimethylaminopropylimide calcium salt copolymer.

References Cited

UNITED STATES PATENTS

| | | | |
|---|---|---|---|
| 3,083,189 | 3/1963 | Reinhard | 260—78.5 |
| 3,157,595 | 11/1964 | Johnson | 210—54 |
| 3,165,486 | 1/1965 | Johnson | 260—29.6 |

JOSEPH L. SCHOFER, Primary Examiner

J. KIGHT III, Assistant Examiner

U.S. Cl. X.R.

260—78, 85.5, 85.7, 86.1, 86.3, 88.3, 88.7, 91.3